US010852233B2

(12) United States Patent
Lincoln et al.

(10) Patent No.: US 10,852,233 B2
(45) Date of Patent: Dec. 1, 2020

(54) SYSTEMS AND METHODS FOR CHAMBERLESS SMOKE DETECTION AND INDOOR AIR QUALITY MONITORING

(71) Applicant: Kidde Technologies, Inc., Wilson, NC (US)

(72) Inventors: David L. Lincoln, Johnston, RI (US); Jennifer M. Alexander, Roseville, MN (US); Michael J. Birnkrant, Wethersfield, CT (US); Peter R. Harris, West Hartford, CT (US)

(73) Assignee: Kidde Technologies, Inc., Wilson, NC (US)

( * ) Notice: Subject to any disclaimer, the term of this patent is extended or adjusted under 35 U.S.C. 154(b) by 167 days.

(21) Appl. No.: 15/871,931

(22) Filed: Jan. 15, 2018

(65) Prior Publication Data

US 2018/0224373 A1    Aug. 9, 2018

Related U.S. Application Data

(63) Continuation-in-part of application No. PCT/US2017/037659, filed on Jun. 15, 2017.

(Continued)

(51) Int. Cl.
*G01N 21/53* (2006.01)
*G01N 21/31* (2006.01)
(Continued)

(52) U.S. Cl.
CPC ............ *G01N 21/53* (2013.01); *G01N 15/06* (2013.01); *G01N 21/31* (2013.01); *G08B 17/107* (2013.01);
(Continued)

(58) Field of Classification Search
CPC ........... G01N 15/06; G01N 2015/0046; G01N 21/53; G01N 2015/0693;
(Continued)

(56) References Cited

U.S. PATENT DOCUMENTS

| 4,111,559 A | 9/1978 | Smith et al. |
| 6,208,252 B1 | 3/2001 | Danilychev |

(Continued)

FOREIGN PATENT DOCUMENTS

| CN | 106781205 A | 5/2017 |
| DE | 102007057520 A1 | 6/2009 |

(Continued)

OTHER PUBLICATIONS

Extended European Search Report dated Jun. 13, 2019, issued during the prosecution of European Patent Application No. EP 19151826.5.

(Continued)

*Primary Examiner* — Hina F Ayub
*Assistant Examiner* — Amanda Merlino
(74) *Attorney, Agent, or Firm* — Locke Lord LLP; Scott D. Wofsy; Georgi Korobanov

(57) ABSTRACT

A system for particulate detection and monitoring includes one or more light sources configured to emit light into a monitored space. The system includes at least two light sensing devices configured to receive scattered light. Respective sensing portions of the three two sensing devices share a common centerline axis. A processor is operatively connected to the two light sensing devices and is configured to evaluate the scattered light for presence of particulates in the monitored space.

17 Claims, 6 Drawing Sheets

Related U.S. Application Data

(60) Provisional application No. 62/517,614, filed on Jun. 9, 2017, provisional application No. 62/515,039, filed on Jun. 5, 2017, provisional application No. 62/350,418, filed on Jun. 15, 2016.

(51) Int. Cl.
  *G01N 15/06* (2006.01)
  *G08B 17/107* (2006.01)
  *G01N 21/47* (2006.01)
  *G01N 15/00* (2006.01)

(52) U.S. Cl.
  CPC ............ *G01N 2015/0046* (2013.01); *G01N 2015/0065* (2013.01); *G01N 2015/0693* (2013.01); *G01N 2021/3155* (2013.01); *G01N 2021/4792* (2013.01); *G01N 2201/0683* (2013.01)

(58) Field of Classification Search
  CPC ... G01N 2021/3155; G01N 2021/4792; G01N 2015/0065; G01N 21/31; G01N 2201/0683; G08B 17/10; G08B 17/107
  See application file for complete search history.

(56) References Cited

U.S. PATENT DOCUMENTS

| | | | |
|---|---|---|---|
| 7,978,087 B2 * | 7/2011 | Siber | G08B 17/107 250/574 |
| 9,036,150 B2 | 5/2015 | Wedler et al. | |
| 9,652,958 B2 | 5/2017 | Zribi et al. | |
| 9,659,485 B2 | 5/2017 | Piccolo, III | |
| 2002/0153499 A1 | 10/2002 | Oppelt et al. | |
| 2009/0218526 A1 | 9/2009 | Shaw et al. | |
| 2011/0216317 A1 | 9/2011 | Marra | |
| 2012/0161796 A1 | 6/2012 | Smith et al. | |
| 2013/0174646 A1 | 7/2013 | Martin | |
| 2016/0097748 A1 | 4/2016 | Hansen et al. | |
| 2016/0343226 A1 | 11/2016 | Fischer et al. | |
| 2017/0153177 A1* | 6/2017 | Siemens | G08B 17/113 |
| 2017/0206764 A1 | 7/2017 | Zribi et al. | |
| 2017/0248699 A1 | 8/2017 | Fang et al. | |
| 2017/0310809 A1 | 10/2017 | Shi et al. | |
| 2018/0156747 A1 | 6/2018 | Le Neel et al. | |

FOREIGN PATENT DOCUMENTS

| | | | |
|---|---|---|---|
| EP | 3029648 A1 * | 6/2016 | ............. G01N 15/06 |
| WO | WO-2013014561 A1 * | 1/2013 | ........... G08B 17/107 |
| WO | 2017/122090 A1 | 7/2017 | |
| WO | WO-2017218763 A1 | 12/2017 | |

OTHER PUBLICATIONS

Extended European search report for European Patent Application No. 18176075.2, dated Jul. 30, 2018.

Extended European search report for European Patent Application No. 18176082.8, dated Jul. 31, 2018.

Extended European Search Report dated May 26, 2020, issued during the prosecution of European Patent Application No. EP 20154106.7.

* cited by examiner

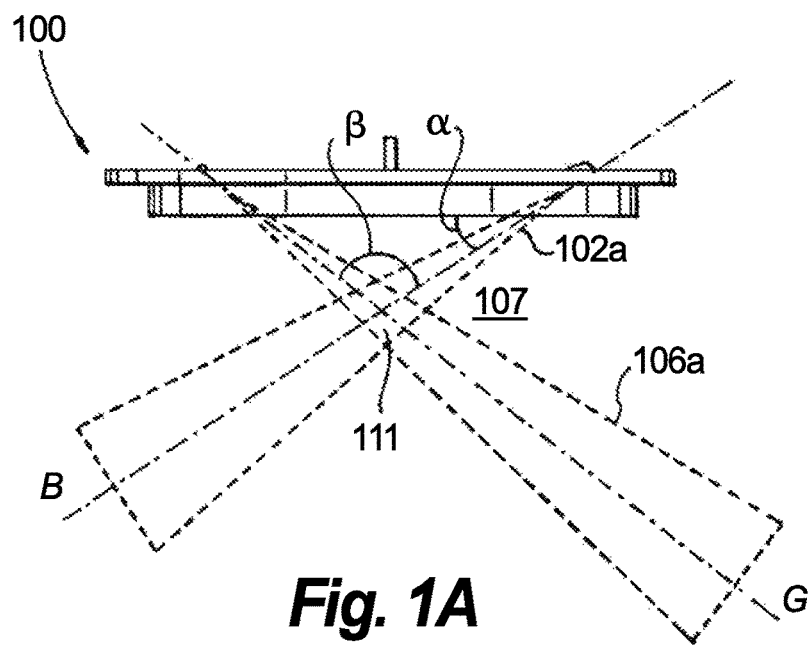
Fig. 1A
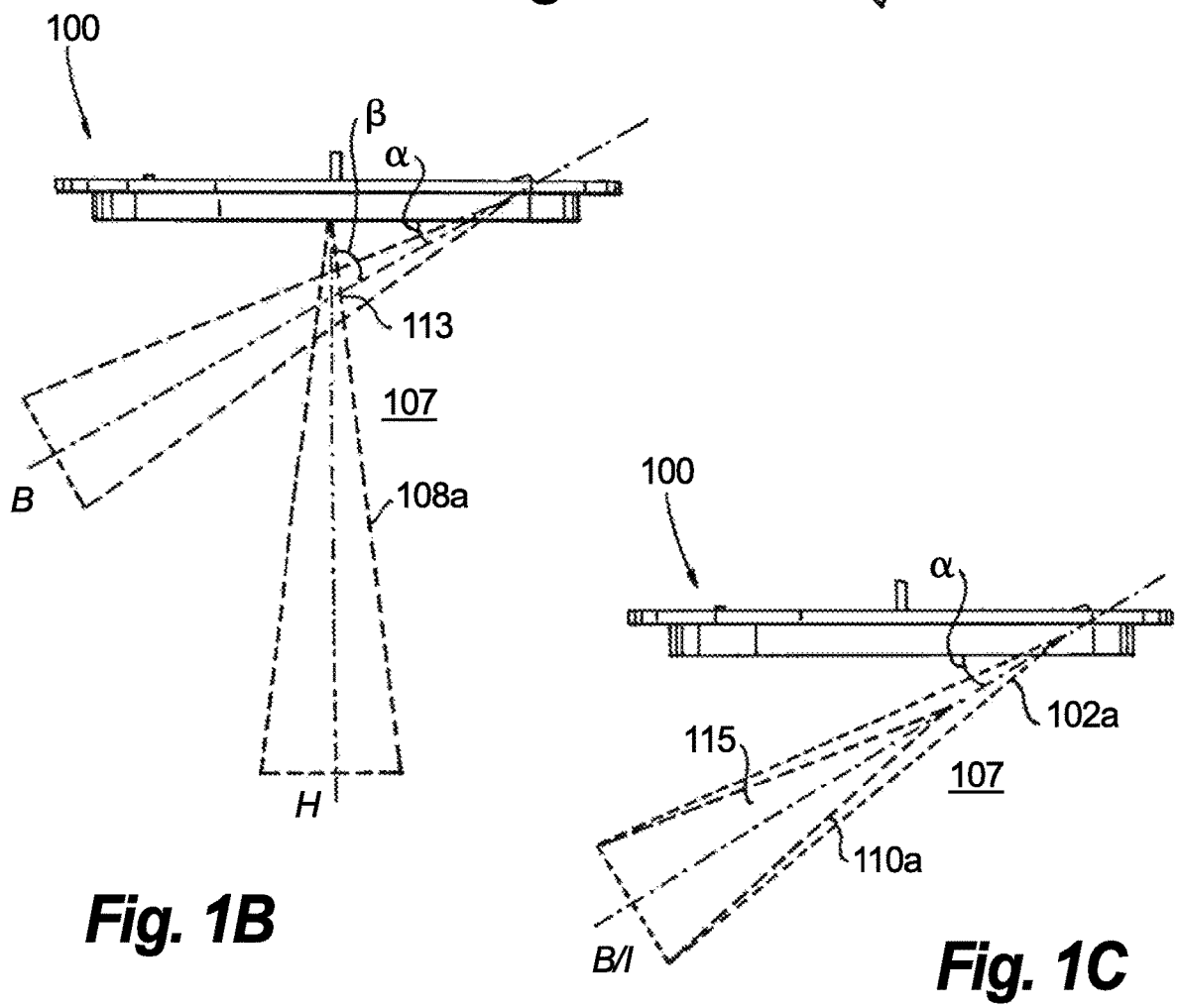
Fig. 1B
Fig. 1C

SYSTEMS AND METHODS FOR CHAMBERLESS SMOKE DETECTION AND INDOOR AIR QUALITY MONITORING

CROSS-REFERENCE TO RELATED APPLICATIONS

This application claims the benefit of earlier filed U.S. Provisional App. No. 62/517,614, filed on Jun. 9, 2017, and U.S. Provisional App. No. 62/515,039 filed on Jun. 5, 2017. This application is a continuation-in-part application of PCT/US2017/037659, filed on Jun. 15, 2017, which claims the benefit earlier filed U.S. Provisional App. No. 62/350,418 filed on Jun. 15, 2016.

BACKGROUND OF THE INVENTION

1. Field of the Invention

The present disclosure relates to smoke detectors, and more particularly to chamberless smoke detectors and air quality detection and monitoring for aircraft.

2. Description of Related Art

Smoke sensors, such as smoke detectors used on aircraft, often located inside of a cabin, bathroom or cargo area, use near infrared light, or lights of other wavelengths, scattering inside a small plastic chamber located inside of the enclosure, with inlets of controlled dimensions to prevent entry of unwanted particles. However, some unwanted airborne particles do make their way into the chamber, causing false alarms. Over time, these particles may also collect at the inlets of the sensor chamber, making it more difficult for smoke particles to diffuse into the chamber. Additionally, particles collecting on chamber surfaces may increase sensitivity thereby resulting in more frequent false or nuisance alarms. Moreover, the enclosure of some detectors can be covered over, thereby inhibiting the detection capabilities.

To alleviate some of these issues, chamber-less smoke detectors may be used. However, with no chamber there is not a physically well-protected measurement volume, meaning a well-defined operational strategy is key to maintaining measurement integrity. Additionally, the lights used for detection are in some cases nearly constantly on and may provide a nuisance to users, and consumes more power. Therefore, there exists a need for improved chamber-less smoke detection. Further, it is often desired to monitor indoor air quality of the same space where the smoke sensors are deployed by detecting the presence of PM2.5 and PM10 particles. The conventional techniques have been considered satisfactory for their intended purpose. However, there is a need for improved chamberless smoke detectors and air quality detection and monitoring for aircraft. This disclosure provides a solution for this need.

SUMMARY OF THE INVENTION

A system for particulate detection and monitoring, e.g., smoke detection and indoor air quality monitoring includes one or more light sources configured to emit light into a monitored space. The system includes at least two light sensing devices configured to receive scattered light. Respective sensing portions of the two light sensing devices share a common centerline axis. A processor is operatively connected to the two light sensing devices and is configured to evaluate the scattered light for presence of particulates in the monitored space.

In some embodiments, at least one of the one or more light sources is configured to emit a respective light cone having a respective symmetry axis and at least one of the two light sensing devices defines a respective acceptance cone having a respective acceptance cone axis. The symmetry axis of the light cone can be parallel to the acceptance cone axis of the light sensing device as viewed from a bottom side of a detector housing. In some embodiments, the symmetry axis of the light cone and the acceptance cone axis of the light sensing device intersect one another as viewed from a bottom side of a detector housing. The one or more light sources can be configured to emit light of different wavelengths. A first light source of the one or more light sources can be configured to emit light at a first wavelength in at least one of a UV spectrum or a visible spectrum. A second light source of the one or more light sources can be configured to emit light at a second wavelength in at least one of the visible spectrum or an IR spectrum.

The system can include a polarizing filter optically coupled to a respective one of the light sensing devices or light sources. An airborne particle type can be discriminated via the use the polarizing filter. The system can include apertures. Each aperture can be associated with one of the light sources or the light sensing devices.

In accordance with another aspect, a system for particulate detection and monitoring includes two or more light sources configured to emit light into a monitored space. At least one of the two or more light sources is configured to emit a respective light cone having a respective symmetry axis. The system includes one or more light sensing devices configured to receive scattered light. At least one of the one or more light sensing devices can define a respective acceptance cone having a respective acceptance cone axis. The symmetry axis of the light cone intersects the respective acceptance cone axis of the light sensing device as viewed from a bottom side of a detector housing. A processor is operatively connected to the one or more light sensing devices.

In accordance with some embodiments, wherein respective sensing portions of at least two of the light sensing devices share a common centerline axis. The two or more light sources can be configured to emit light of different wavelengths, similar to the light sources described above. The system can include a polarizing filter similar to the polarization filter recited above.

In accordance with another aspect, a method of operating a system for particulate detection and monitoring includes emitting light from one or more light sources of the system. The method includes detecting scattered light with at least two light sensing devices of the system. Respective sensing portions of two light sensing devices share a common centerline axis. The detection of scattered light is indicative of one or more particulates in the monitored space.

In some embodiments, emitting light from the one or more light sources includes emitting light from at least one of the one or more light sources as a respective light cone. Each light cone can include a respective symmetry axis. At least one of the two light sensing devices can define a respective acceptance cone having a respective acceptance cone axis. In some embodiments, the symmetry axes of the light cones can be parallel to one another or can intersect one another as viewed from a bottom side of a detector housing. In some embodiments, the symmetry axis of the light cone and the acceptance cone axis of the light sensing device intersect one another as viewed from a bottom side of a detector housing. In some embodiments, the symmetry axis of the light cone is parallel to the acceptance cone axis of the light sensing device as viewed from a bottom side of a detector housing. Emitting light from the one or more light sources can include emitting a first light having a first wavelength from one of the light sources and emitting a second light having a second wavelength from another one of the light sources. The first wavelength can be in at least one of the UV spectrum or the visible spectrum, and the second wavelength can be in at least one of the visible spectrum or the IR spectrum. The method can include polarizing light entering into at least one of light sensing devices, and/or polarizing light emitted by the one or more light sources with a polarizing filter. The method can include discriminating between airborne particle types using the polarizing filter. The method can include determining and monitoring for target gases, particulate contaminants, microbial contaminants or other conditions, in addition to smoke, based on the detected scattered light.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1A is a schematic depiction of an embodiment of a system for particulate monitoring constructed in accordance with the present disclosure, showing an overlap region between a light cone and an acceptance cone that forms a sensing volume;

FIG. 1B is a schematic depiction of the system of FIG. 1A, showing an overlap region between a light cone and a second acceptance cone that forms a second sensing volume;

FIG. 1C is a schematic depiction of the system of FIG. 1A, showing an overlap region between a light cone and a third acceptance cone that forms a third sensing volume;

DETAILED DESCRIPTION OF THE PREFERRED EMBODIMENTS

Figure 2A:
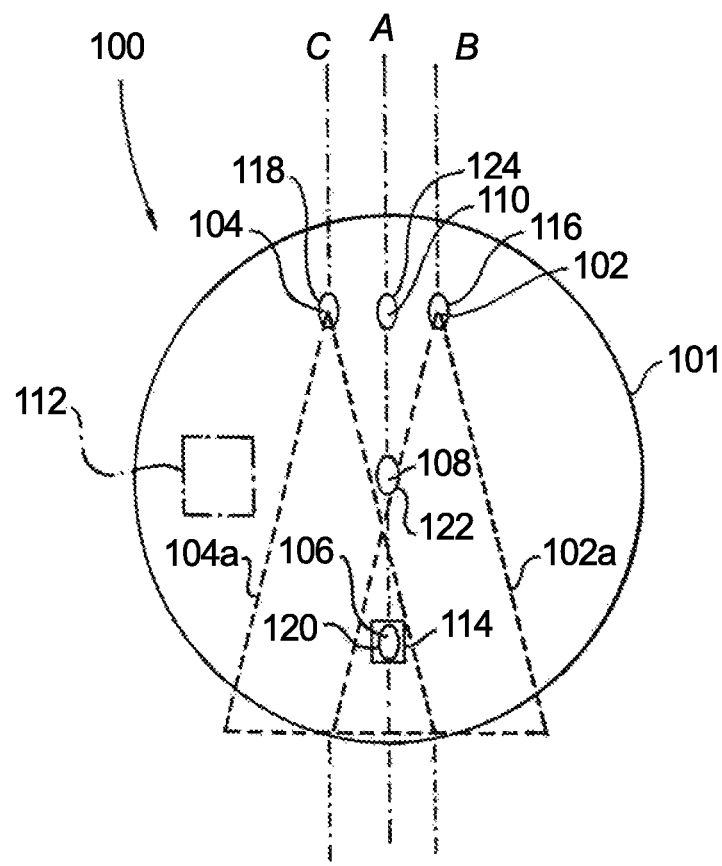
FIG. 2A is a bottom view of the system of FIGS. 1A-1C, showing a plurality of light sources and light sensing devices and first and second light emission cones.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIGS. 1A-1B and is designated generally by reference character 100. Other embodiments of systems in accordance with the disclosure, or aspects thereof, are provided in FIGS. 2-7B, as will be described. The systems and methods described herein can be used in systems for chamberless particulate monitoring in aircraft including smoke and air quality monitoring, such as aircraft cabins, cargo areas, and the like.

As shown in FIGS. 1A-1C, a chamberless system for particulate detection and monitoring 100 utilizes a photoelectric method for detection of particulates into a monitored space 107. The monitored space 107 is in proximity to detector 100 and extends into the environment being monitored. In buildings, space 107 would extend into a room, duct, elevator shaft, and the like. In an aircraft, space 107 would extend into a cargo bay, aircraft cabin, or electronics rack. The monitored space 107 is dependent upon the spatial placement of light emitting and detection elements within 100.

With reference now to FIG. 2A, system 100 includes light sources 102 and 104 configured to emit light into a monitored space. The first light source 102 and the second light source 104 may include a light emitting diode (LED). The first light source 102 and the second light source 104 may emit light at one or more wavelengths into monitored space 107. In an embodiment, the first light source 102 may emit light of wavelengths characteristic of infrared light, and the second light source 104 may emit light of wavelengths characteristic of blue visible light. The infrared light may be used in the detection and false alarm discrimination of smoke, and the blue visible light may be used in the false alarm discrimination of smoke. Additionally, in some embodiments, a combination of infrared light and ultraviolet light may be used. The light emitted from first and second light sources 102 and 104, respectively, is indicated schematically by the first and second light cones 102a and 104a, respectively. Light cones 102a and 104a define respective symmetry axes B and C that are parallel to one another. Moreover, as shown in FIGS. 1A-1C, lights cones 102a and 104a extend downwards at an angle α of about 25 degrees with respect to a bottom surface of the housing 101. Angle α can range from 1 degree to 90 degrees in some embodiments, and 5 degrees to 40 degrees in some cases.

This also applies to 202a and 204a, as described below. The downward angle for 102a, 104a, 202a, and 204a are independent parameters. The angles for 102a, 104a, 202a, and 204a can be the same at 25 degrees, or some can be greater or less than 25 degrees.

Figure 2B:
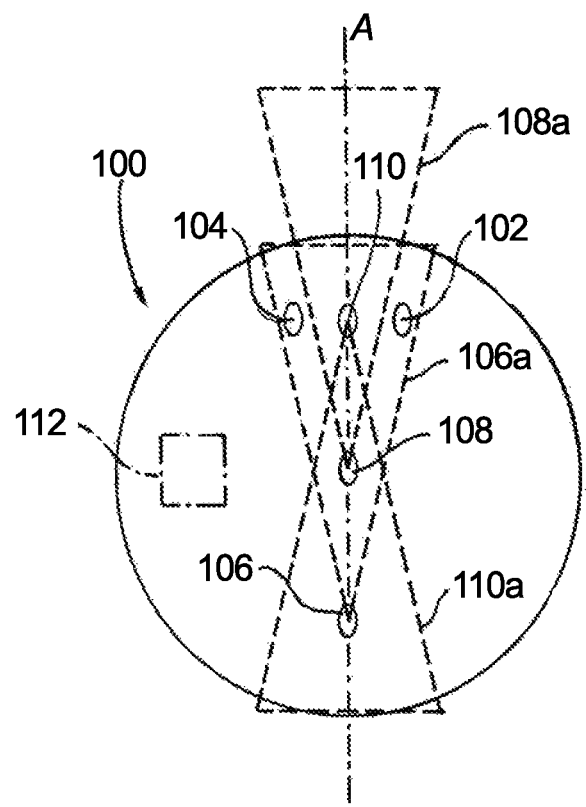
FIG. 2B is a bottom view of the system of FIGS. 1A-1C, showing a plurality of light sources and light sensing device and a plurality of acceptance cones associated with the light sensing devices.

With continued reference to FIG. 2A-2B, the system 100 includes three light sensing devices 106, 108 and 110 configured to receive scattered light, e.g. light originally emitted from the light sources 102 and/or 104 and then scattered back off any airborne particles, or other obstructions. The system 100 includes a polarizing filter 114 optically coupled to a light sensing device 106. Polarizing filter 114 allows discrimination between airborne particle types. Similarly one or more respective polarizing filters 114 can be optically coupled to light sensing devices 108 and 110 and light sources 102 and 104. System 100 includes a housing 101 in which light sources 102 and 104 and light sensing devices 106, 108 and 110 are operatively mounted. The housing 101 can include apertures 116, 118, 120, 122 and 124 associated with the given light sources 102 and 104 and light sensing devices 106, 108 and 110, respectively. Respective sensing portions of light sensing devices 106, 108 and 110, e.g. the portions of light sensing devices 106, 108 and 110 visible in FIG. 2, and their respective apertures 120, 122 and 124 share a common centerline axis A. The sensing volumes are dependent on the position of the light sensing devices 106, 108, and 110 and the light sources 102 and 104. By positioning the light sensing devices 106, 108 and 110, in a line and reducing distance between light sensing devices 106 and 108, and light source 104, the sensing volume reduces.

With continued reference to FIGS. 2A-2B, the light sensing devices 106, 108 and 110 are configured to measure signals, e.g. scattered light, from the first light source 102 and the second light source 104. Each light sensing device 106, 108 and 110 defines a respective acceptance cone 106a, 108a and 110a, respectively. Each acceptance cone 106a, 108a and 110a has a respective central axis G, H and I, respectively, as shown in FIGS. 1A-1C. By having the light sensing devices 106, 108 and 110 along the same central axis A, sensing can be better achieved as compared with traditional sensing systems because there is greater overlap between emitting regions, e.g. the first and second light cones 102a and 104a, and acceptance cones 106a, 108a and 110a of the light sensing devices 106, 108 and 110. The detection capability of system 100, even in cargo spaces, provide robust detection capabilities to detect various particles and/or to discriminate between particle types. Light sensing devices 106, 108 and 110 can be photodiodes, light sensing devices such as Avalanche PhotoDiodes (APDs), Multi-Pixel Photon Counters (MPPCs), and the like.

As shown in FIGS. 1A-2B, in an embodiment, light sensing device 106 is a first light sensing device, the light sensing device 108 is a second light sensing device, and the light sensing device 110 is a third light sensing device. The overlap of the field of view, e.g. acceptance cones 106a, 108a and 110a, with the first light cone 102a form different overlapping sensing volumes 111, 113 and 115, respectively. Light sensing devices 106, 108 and 110 are located within different regions of the system 100 with a line of sight to a light emitted from the first light source 102 (indicated schematically by light cone 102a) and light emitted from the second light source 104 (indicated schematically by light cone 104a).

As shown in FIGS. 1A and 2A, light sensing device 106 is a forward scatter light sensing device and defines an acceptance cone 106a having an acceptance cone axis G. Acceptance cone axis G and the respective axes of light cones 102a and 104a have an angle of coincidence β of 130 degrees, as viewed in FIG. 1A. Acceptance cone 106a overlaps with first light cone 102a and second light cone 104a (not visible in the view of FIG. 1A). The overlap defines a forward-scatter sensing volume 111. As shown in FIG. 1B, light sensing device 108 is a mid-scatter light sensing device and defines an acceptance cone 108a having an acceptance cone axis H. Acceptance cone axis H and the respective axes of light cones 102a and 104a have an angle of coincidence β of 65 degrees, as viewed in FIG. 1B. Acceptance cone 108a overlaps with first light cone 102a and second light cone 104a (not visible in the view of FIG. 1B).

Figure 6A:
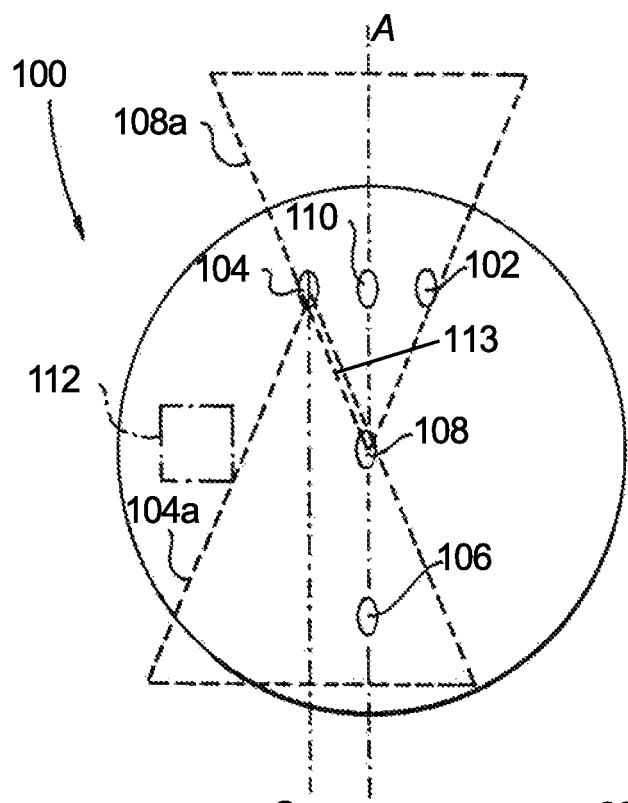
FIG. 6A is a bottom view of the system of FIGS. 1A-1C, showing a mid-scatter acceptance cone and a second light emission cone.

Acceptance cone axis H and the respective axes of light cones 102a and 104a have an angle of coincidence β of 65 degrees. The overlap defines a mid-scatter sensing volume 113 (part of which is also shown in FIG. 6A). As shown in FIG. 1C, light sensing device 110 is a back-scatter light sensing device and defines an acceptance cone 110a that defines an acceptance axis I. Acceptance axis I is substantially parallel to axes of symmetry B and C and defines a zero degree angle of coincidence with both axes, as viewed in FIG. 1C. Acceptance cone 110a overlaps with first light cone 102a and second light cone 104a. The overlap defines a back-scatter sensing volume 115. The angle of coincidence β can vary depending on the downward angles for 102a, 104a, 202a, and 204a.

A processor 112 is operatively connected to the light sensing devices 106, 108 and 110 and is configured to evaluate the scattered light for presence of one or more indoor air quality conditions in the monitored space 107. The processor 112 is operatively connected to the plurality of light sources 102 and 104 and the plurality of sensors 106, 108 and 110. The processor 112 includes a memory (not shown) capable of storing executable instructions. The processor 112 can execute the instructions, such as in connection with one or more applications, processes or routines to analyze the signals detected by the plurality of sensors to make alarm decisions, for example, after preset threshold levels are reached.

As shown in FIGS. 3A-3C, 4, and 6B another embodiment of a system for particulate detection and monitoring 200 includes a plurality of light sources 202 and 204 and a plurality of light sensing devices 206, 208 and 210. Light sensing devices 206, 208 and 210 are similar to light sensing devices 106, 108 and 110 described above and the description provided above with respect to light sensing devices 106, 108 and 110 readily applies to light sensing devices 206, 208 and 210. System 200 includes a housing 201, similar to housing 101. Housing 201 includes apertures 216, 218, 220, 222 and 224 associated with the given light sources 202 and 204 and light sensing devices 206, 208 and 210, respectively. In the system 200, the light emitted from light sources 202 and 204 is indicated schematically by light cones 202a and 204a, respectively. Light sources 202 and 204 are similar to light sources 102 and 104 except that light sources 202 and 204, via their respective apertures 216 and 218, for example, are angled toward one another so that the symmetry axes E and F of their respective first and second light cones 202a and 204a, respectively, intersect at least one of the acceptance cone axes J, K or L, described below, as viewed from the bottom side of detector housing 201.

With continued reference to FIGS. 3A-3C and 4, the first light source 202 and the second light source 204 may include a light emitting diode (LED) and may emit light at one or more wavelengths into a monitored space 207, similar to light sources 102 and 204. The monitored space 207 is similar to that described above with respect to FIG. 1. Similar to first light source 102 and second light source 104, first light source 202 may emit light of wavelengths characteristic of infrared light, and the second light source 204 may emit light of wavelengths characteristic of blue visible light. The infrared light may be used in the detection and false alarm discrimination of smoke, and the blue visible light may be used in the false alarm discrimination of smoke. Additionally, in some embodiments, a combination of infrared light and ultra-violet light may be used. System 200 can also include a polarizing filter, similar to filter 114.

With continued reference to FIGS. 3A-3C and 4, light sensing devices 206, 208 and 210 are located within different regions of the system 200 with a line of sight to a light emitted from the first light source 202 (indicated schematically by light cone 202a) and a light emitted from the second light source 204 (indicated schematically by light cone 204a). The overlap of the field of view, e.g. acceptance cones 206a, 208a and 210a, with the first and second light cones 202a and 204a form different overlapping sensing volumes. Acceptance cones 206a, 208a and 210a and their axes (discussed more below) are very similar to acceptance cones 106a, 108a and 110a depicted in FIG. 2B for system 100.

Figure 3A:
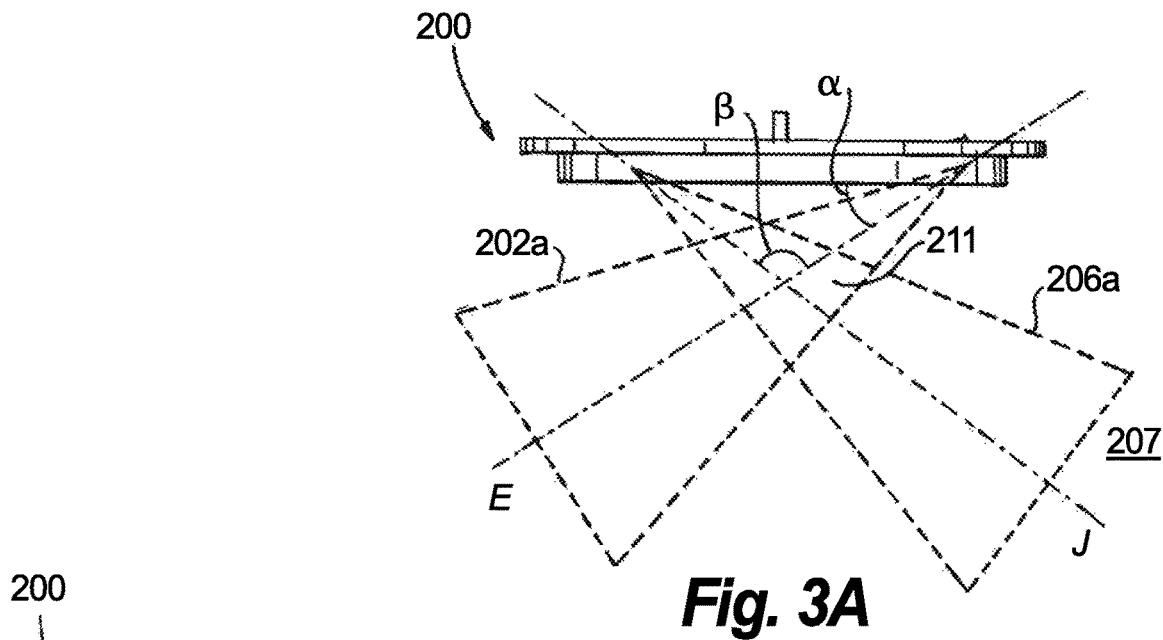
FIG. 3A is a schematic depiction of another embodiment of a system for particulate monitoring constructed in accordance with the present disclosure, showing an overlap region between a light cone and an acceptance cone that forms a sensing volume.
Figure 3B:
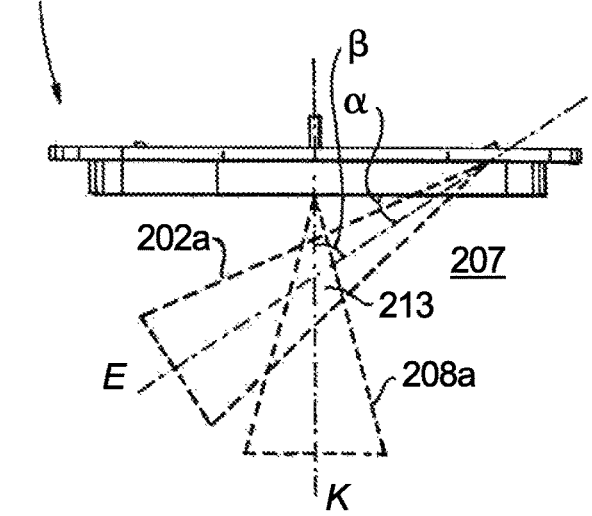
FIG. 3B is a schematic depiction of the system of FIG. 3A, showing an overlap region between a light cone and a second acceptance cone that forms a second sensing volume.
Figure 3C:
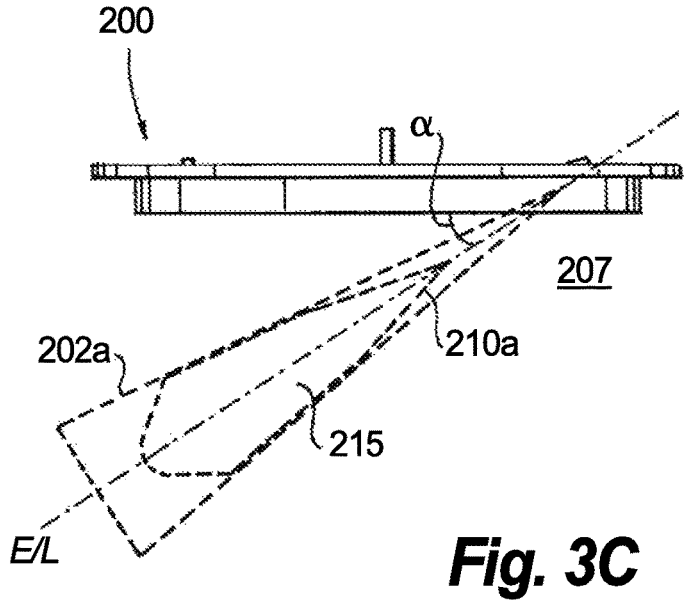
FIG. 3C is a schematic depiction of the system of FIG. 3A, showing an overlap region between a light cone and a third acceptance cone that forms a third sensing volume.
Figure 4:
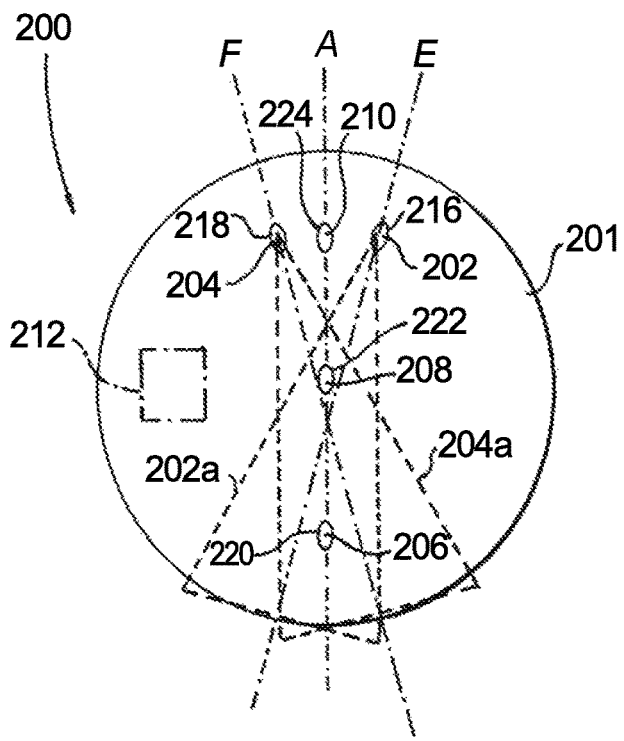
FIG. 4 is a bottom view of the system of FIGS. 3A-3C, showing a plurality of light sources and light sensing devices and first and second light emission cones.

As shown in FIG. 3A, light sensing device 206 is a forward scatter light sensing device and defines an acceptance cone 206a having an acceptance cone axis J. Acceptance cone axis J and the respective axes of light cones 202a and 204a have an angle of coincidence β of 130 degrees, as viewed in FIG. 3A. Acceptance cone 206a overlaps with first light cone 202a and second light cone 204a (not visible in the view of FIG. 3A). The overlap defines a forward-scatter sensing volume 211. As shown in FIG. 3B, light sensing device 208 is a mid-scatter light sensing device and defines an acceptance cone 208a having an acceptance cone axis K. Acceptance cone axis K and the respective axes of light cones 202a and 204a have an angle of coincidence β of 65 degrees, as viewed in FIG. 3B. Acceptance cone 208a overlaps with first light cone 202a and second light cone 204a (not visible in the view of FIG. 3B). The overlap defines a mid-scatter sensing volume 213. As shown in FIG. 3C, light sensing device 210 is a back-scatter light sensing device and defines an acceptance cone 210a that defines an acceptance axis L. Symmetry axis E of light cone 202a would be extending partially in/out of the page as oriented in FIG. 3C. Acceptance cone 210a and acceptance axis L overlap light cone 202a and its respective symmetry axis E in the view of FIG. 3C due to the zero degree angle of coincidence, as viewed in FIG. 3C. Acceptance cone 210a overlaps with first light cone 202a and second light cone 204a. The overlap defines a back-scatter sensing volume 215.

By having the emissions of light sources 202 and 204 angled toward one another, sensing at a close range can be better achieved as compared with traditional sensing systems because there is greater overlap between emitting regions, e.g. the first and second light cones 202a and 204a, and sensing regions of light sensing devices 206 and 208, even more of an overlap than system 100. The back-scatter sensing volume 215, as shown in FIG. 3C is truncated as compared to back-scatter sensing volume 115, as shown in FIG. 1C. This is particularly helpful in aerospace applications where large amounts of cargo may be stored in the monitored space and may be very close, e.g. right under a given detector system 100 or 200. The detection capability of system 200, even in cargo spaces such as those described above, provide robust detection capabilities to detect various particles and/or to discriminate between particle types.

Figure 6B:
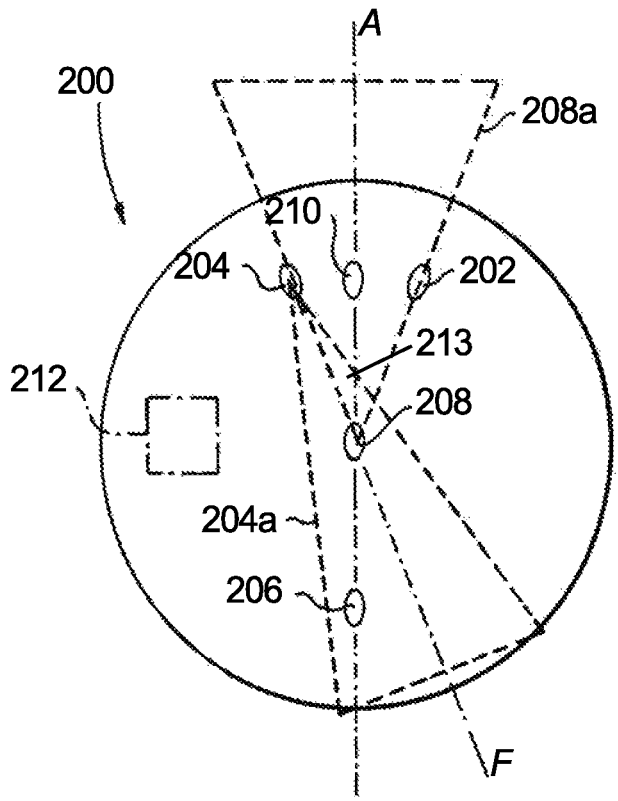
FIG. 6B is a bottom view of the system of FIGS. 3A-3C, showing a mid-scatter acceptance cone and a second light emission cone.
Figure 7A:
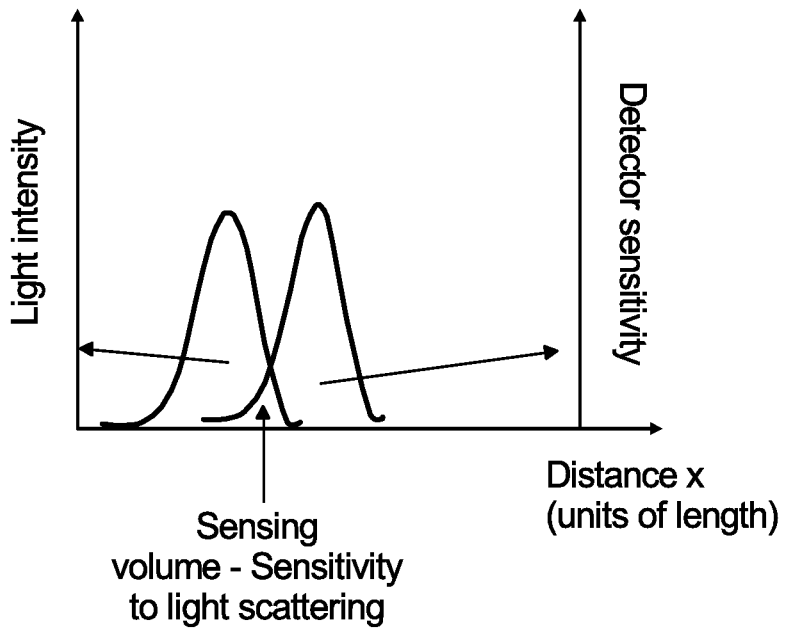
FIG. 7A is a schematic depiction of the overlap of the mid-scatter acceptance cone and the second light emission cone of FIG. 6A.
Figure 7B:
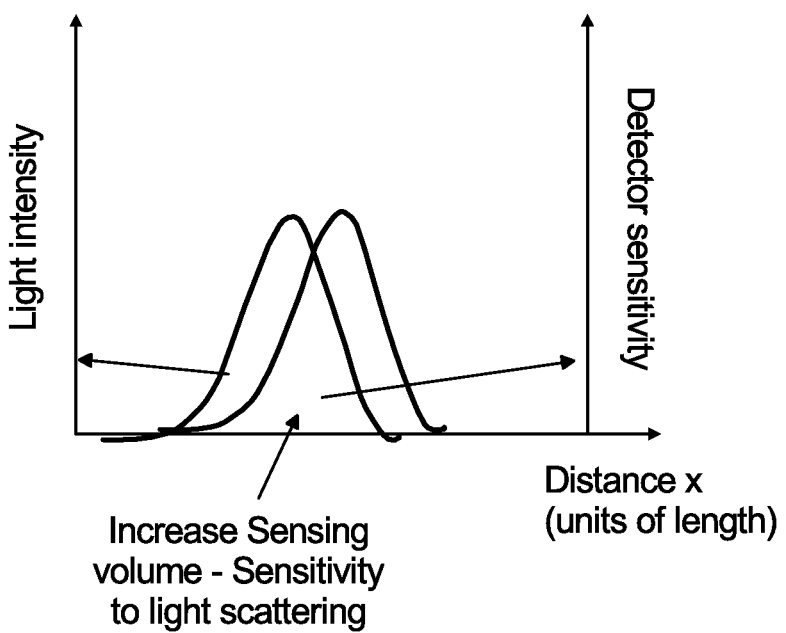
FIG. 7B is a schematic depiction of the overlap of the mid-scatter acceptance cone and the second light emission cone of FIG. 6B, showing the increased sensing volume as compared to FIG. 7A.

FIGS. 6A and 6B provide a comparison of the sensing volumes between systems 100 and 200. System 100 is depicted in FIG. 6A and system 200 is depicted in FIG. 6B. As shown by FIG. 6B, by having the light cones 202a and 204a of light sources 202 and 204 angled toward the acceptance cone 208a, sensing via the mid-scatter light sensing device 208, can be better achieved as compared with system 100. This is because there is greater overlap between the light cones 202a and 204a (only cone 204a is shown for sake of simplicity) and acceptance cone 208a than compared with system 100. This is further exemplified by the charts of FIGS. 7A and 7B. FIG. 7A is associated with system 100 and FIG. 7B is associated with system 200. FIGS. 7A and 7B show how the distribution of light intensity from the respective light sources and light-sensor sensitivity form their respective sensing volumes.

Figure 5:
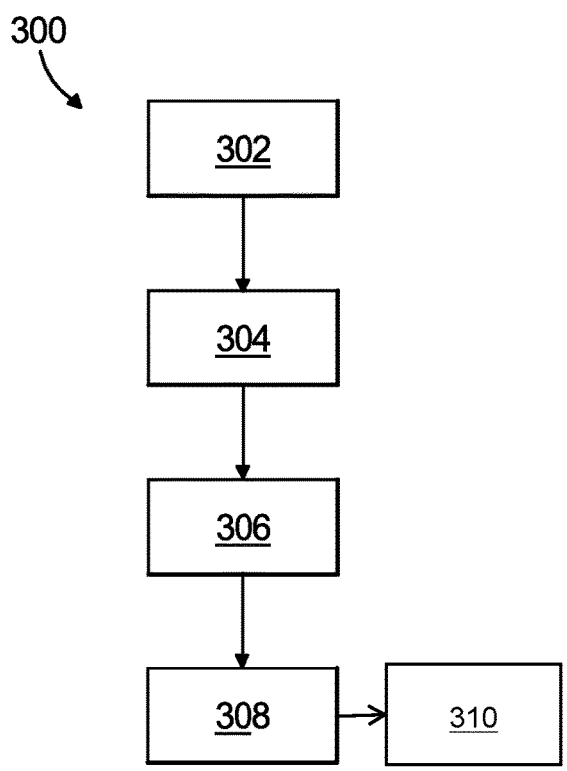
FIG. 5 is a schematic diagram of a method of operating a system for particulate monitoring.

As shown in FIG. 5, a method 300 of operating a system for particulate detection and monitoring, e.g. systems 100 or 200, includes emitting light from one or more light sources, e.g. light sources 102, 104, 202 or 204, of the system into a monitored space, as indicated schematically by box 302. Emitting light from the light sources includes emitting light from two light sources as respective light cones, e.g. light cones, 102a and 104a or 202a and 204a. Emitting light from the light sources includes emitting a first light having a first wavelength from one of the light sources and emitting a second light having a second wavelength from the other one of the light sources. The first wavelength is in at least one of the UV spectrum or the visible spectrum, and the second wavelength is in at least one of the visible spectrum or the IR spectrum.

The method 300 includes polarizing light entering into at least one of light sensing devices, e.g. light sensing devices 106, 108, or 110, or light sensing devices 206, 208 or 210, and/or the light sources with a polarizing filter, e.g. polarizing filter 114, as indicated schematically by box 304. Polarized light refers to the orientation of the electric field with respect to the symmetry axes of the light cone and the normal vector to the surface of the detector 100. The light sources 102, 104, 202 or 204 can emit polarized light with the electric field oriented parallel to the normal vector, perpendicular or an arbitrary angle. In addition, the polarizing filter 114 on light sensing devices 106, 108, or 110, or light sensing devices 206, 208 or 210 can be oriented so that the fast axis of the polarizing accepts light polarized with a particular orientation. Light scattering by a material is polarization dependent for most materials. The orientation of the polarizing filter on the light sources and light sensing devices are oriented to enhance the difference between particulate scattering of interest and nuisances such as bugs or solid objects such as cargo containers.

In some embodiments, method 300 includes discriminating between airborne particle types using the polarizing filter, as indicated schematically by box 306. The method 300 includes detecting scattered light with the light sensing devices of the system, as indicated schematically by box 308. The detection of scattered light is indicative of one or more indoor air quality conditions in the monitored space. The method includes determining and monitoring for target gases, particulate contaminants, microbial contaminants or other conditions, in addition to smoke, based on the detected scattered light, as indicated schematically by box 310.

Those skilled in the art will readily appreciate that in some embodiments the transmitted light (e.g. from LEDs 102, 104, 202 or 404) excites fluorescent particles, such as mold or pollen particles or other microbial contaminants, in the space. One or more of the light sensing devices, e.g. 106, 108, 110, 206, 208 or 210 of the systems 100 or 200, are utilized to sense light emitted (e.g. scattered back) from the fluorescent particles. Embodiments of the present disclosure may be utilized to detect or monitor the space for the presence of gaseous species in the space. The target gaseous species may include CO, radon, $H_2S$, VOCs, refrigerants, hydrocarbons or others. In some embodiments, systems 100 and 200 are configured to detect an ambient light level in the space to improve sensitivity and reliability of detection smoke and for other indoor air quality monitoring and detection. The embodiments disclosed herein allow for systems 100 and 200 to detect and monitor other indoor air quality conditions, such as target gases, particulate contaminants, microbial contaminants or other conditions, in addition to smoke. This eliminates the need for additional, separately powered indoor air quality sensors to be utilized in the same space in which the smoke detector is placed, resulting in substantial consumer and business cost savings.

The methods and systems of the present disclosure, as described above and shown in the drawings, provide particulate detection and monitoring with superior properties including increased sensing robustness in aerospace applications that are better able to meet Federal Aviation Administration (FAA) requirements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for smoke particulate detection and monitoring, comprising:
    two or more light sources configured to emit light into a monitored space;
    at least three light sensing devices configured to receive scattered light, wherein respective sensing portions of the three light sensing devices share a common centerline axis and wherein each light source is an equal distance from the common centerline axis; and
    a processor operatively connected to the at least three light sensing devices to evaluate the scattered light for presence of particulates in the monitored space.

2. The system of claim 1, wherein at least one of the two or more light sources is configured to emit a respective light cone having a respective symmetry axis, wherein at least one of the three light sensing devices defines a respective acceptance cone having a respective acceptance cone axis, wherein the symmetry axis of the light cone is parallel to the acceptance cone axis of the light sensing device as viewed from a bottom side of a detector housing.

3. The system of claim 1, wherein at least one of the two or more light sources is configured to emit a respective light cone having a respective symmetry axis, wherein at least one of the three light sensing devices defines a respective acceptance cone having a respective acceptance cone axis, wherein the respective symmetry axis of the light cone intersects the respective acceptance cone axis of the light sensing device as viewed from a bottom side of a detector housing.

4. The system of claim 1, wherein the two or more light sources are configured to emit light of different wavelengths.

5. The system of claim 1, wherein a first light source of the two or more light sources is configured to emit light at a first wavelength in at least one of a UV spectrum or a visible spectrum, and wherein a second light source of the two or more light sources is configured to emit light at a second wavelength in at least one of the visible spectrum or an IR spectrum.

6. The system of claim 1, further comprising a polarizing filter optically coupled to at least one of the light sensing devices or the light sources.

7. A system for smoke particulate detection and monitoring and indoor air quality monitoring, comprising:
    two or more light sources configured to emit light into a monitored space, wherein at least two one of the two or more light sources is configured to emit a respective light cones cone each having a respective symmetry axis; and
    three or more light sensing devices configured to receive scattered light, wherein at least one of the three or more light sensing devices defines a respective acceptance cone having a respective acceptance cone axis, wherein the respective symmetry axis of the light cone intersects the respective acceptance cone axis of the acceptance cone as viewed from a bottom side of a detector housing wherein the three light sensing devices share a common centerline axis and each light source is an equal distance from the common centerline axis; and
    a processor operatively connected to the three light sensing devices to evaluate the scattered light for the presence of one or more particulates in the monitored space.

8. The system of claim 7, wherein the two or more light sources are configured to emit light of different wavelengths.

9. The system of claim 7, wherein a first light source of the two or more light sources is configured to emit light at a first wavelength in at least one of the UV spectrum or the visible spectrum.

10. The system of claim 9, wherein a second light source of the two or more light sources is configured to emit light at a second wavelength in at least one of the visible spectrum or the IR spectrum.

11. The system of claim 7, further comprising a polarizing filter optically coupled to at least one of a respective one of the light sensing devices or a respective one of the light sources.

12. A method of operating a system for particulate detection and monitoring, comprising:
    emitting light from two or more light sources of the system for particulate detection and monitoring into a monitored space; and
    detecting scattered light with at least three light sensing devices of the system for smoke particulate detection and monitoring, wherein the three light sensing devices share a common centerline axis and each light source is an equal distance from the common centerline axis, and wherein the detection of scattered light is indicative of one or more particulates in the monitored space.

13. The method of claim 12, wherein emitting light from the two or more light sources includes emitting light from the at least one of the two or more light sources as a respective light cone having a respective symmetry axis, wherein at least one of the three light sensing devices defines a respective acceptance cone having a respective acceptance cone axis, wherein the symmetry axis of the light cone is parallel to the acceptance cone axis of the light sensing device as viewed from a bottom side of a detector housing.

14. The method of claim 12, wherein emitting light from the two or more light sources includes emitting light from at least one of the two light sources as respective light cone having a respective symmetry axis, wherein at least one of the three light sensing devices defines a respective acceptance cone having a respective acceptance cone axis, wherein the respective symmetry axis of the light cone intersects the respective acceptance cone axis of the acceptance cone as viewed from a bottom side of a detector housing.

15. The method of claim 12, wherein emitting light from the two or more light sources includes emitting a first light having a first wavelength from one of the light sources, wherein the first wavelength is in at least one of the UV spectrum or the visible spectrum, and emitting a second light having a second wavelength from another one of the light sources, wherein the second wavelength is in at least one of the visible spectrum or the IR spectrum.

16. The method of claim 12, further comprising polarizing light entering into at least one of the light sensing devices with a polarizing filter.

17. The method of claim 16, further comprising determining and monitoring for target gases, particulate contaminants, PM2.5, PM10, microbial contaminants, or smoke.

* * * * *